(12) United States Patent
Venturini (10) Patent No.: US 12,315,056 B2
(45) Date of Patent: May 27, 2025

(54) ACCESSORY DETECTION AND DETERMINATION FOR AVATAR ENROLLMENT

(71) Applicant: Apple Inc., Cupertino, CA (US)

(72) Inventor: Gabriela N. Venturini, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 17/819,746

(22) Filed: Aug. 15, 2022

(65) Prior Publication Data
US 2023/0055013 A1    Feb. 23, 2023

Related U.S. Application Data

(60) Provisional application No. 63/236,082, filed on Aug. 23, 2021.

(51) Int. Cl.
*G06T 13/40* (2011.01)
*G06V 40/16* (2022.01)

(52) U.S. Cl.
CPC ............ *G06T 13/40* (2013.01); *G06V 40/171* (2022.01)

(58) Field of Classification Search
CPC .... G06T 13/40; G06V 40/171; G06V 10/469; G06V 10/761; G06V 10/44
See application file for complete search history.

(56) References Cited

U.S. PATENT DOCUMENTS

| | | | | |
|---|---|---|---|---|
| 2004/0218823 | A1* | 11/2004 | Kondo | H04N 19/527 382/239 |
| 2008/0107345 | A1* | 5/2008 | Melikian | G06V 10/255 382/209 |
| 2015/0293382 | A1* | 10/2015 | Jethmalani | G02C 13/003 351/204 |
| 2015/0324998 | A1* | 11/2015 | Song | G06T 5/40 382/171 |
| 2015/0362761 | A1* | 12/2015 | Adler | G06T 7/55 705/26.5 |
| 2021/0065285 | A1* | 3/2021 | Goldberg | G02C 13/003 |
| 2021/0110161 | A1* | 4/2021 | Wang | G06V 40/165 |
| 2021/0327148 | A1* | 10/2021 | Goldberg | G06T 7/70 |

* cited by examiner

*Primary Examiner* — Jitesh Patel
(74) *Attorney, Agent, or Firm* — Blank Rome LLP (57) ABSTRACT

Devices, methods, and non-transitory program storage devices (NPSDs) are disclosed herein to allow individual users an opportunity to create customized instances of three-dimensional (3D) avatars, wherein each instance of the avatar may be customized to have particular visual characteristics and/or accessories that may reflect an individual user's appearance. When images are captured, e.g., during an individual user's avatar enrollment or customization process, novel shape matching techniques may be employed between two-dimensional (2D) objects of interest (e.g., eyeglasses frames) identified in the enrollment image and 3D models stored in one or more 3D model object libraries. A ranked listing of 3D models from an object library that provide the best shape matches to the identified 2D objects of interest in the captured image may automatically be determined and/or presented to the user for selection, e.g., via a user interface, for use in the creation and/or customization of the user's 3D avatar.

20 Claims, 9 Drawing Sheets

ACCESSORY DETECTION AND DETERMINATION FOR AVATAR ENROLLMENT

TECHNICAL FIELD

This disclosure relates generally to the field of image processing. More particularly, but not by way of limitation, it relates to techniques for improved three-dimensional (3D) object model matching for objects (e.g., personal accessories) identified in two-dimensional (2D) images, e.g., when matching objects of interest identified in enrollment images of individual users captured during a 3D avatar creation or customization process.

BACKGROUND

An "avatar," as used herein, may refer to a visual representation of an individual user of a device (or their alter ego) in a virtual environment. An avatar often takes the form of a three-dimensional (3D) model used in computer games or a two-dimensional (2D) icon or picture. Avatars are increasingly used in online social networking, gaming, and/or other online communications, typically as a surrogate for an actual photograph of the user.

Avatars can offer a measure of privacy, while still allowing the users to have control over their online identities. As a means for self-expression, many users may desire to customize their own avatars to show physical characteristics that reflect the actual appearances of the users. The users can also customize their avatars with various accessories, such as clothing items, eyeglasses, headwear, and more, which can reflect the users' individual styles, fashion tastes, and/or real-life appearances.

SUMMARY

In the devices, methods, and NPSDs described in this Specification, each individual user may be given an opportunity to create customized instances of the user's individual avatar, wherein each instance of the avatar may be customized to have a particular facial expression, visual characteristics, body language, and/or accessories that may reflect an individual user's appearance in a particular situations and circumstances.

The accessories worn by a particular instance of a user's avatar may be selected from among one or more 3D model object libraries. When images are captured, e.g., enrollment images that may be captured during an individual user's avatar creation or customization process, novel shape matching techniques may be employed between 2D objects of interest (e.g., eyeglasses frames) identified in the enrollment image and 3D models stored in a 3D model object library. In some examples, a ranked listing of the 3D models from the object library that provide the best shape matches to the identified 2D objects of interest in the enrollment image may be automatically determined and/or presented to the user for selection, e.g., via a user interface, for use in the creation and/or customization of the user's 3D avatar.

Thus, in a first embodiment, a device is disclosed, comprising: a memory; an image capture device; and one or more processors operatively coupled to the memory, wherein the one or more processors are configured to execute instructions causing the one or more processors to: obtain a first image (e.g., an avatar enrollment image) captured by the image capture device, wherein the first image comprises a first subject wearing a first pair of eyeglasses; determine a first outline of the first pair of eyeglasses (e.g., with the eyeglasses oriented in a specified view, such as a frontal view); obtain an object library, wherein the object library comprises a first plurality of 3D models of pairs of eyeglasses; determine a second outline for each of a first set of the first plurality of 3D models of pairs of eyeglasses in the object library (e.g., with each 3D model oriented in the specified view), wherein the first set of the first plurality of 3D models of pairs of eyeglasses may comprise a portion of the models stored in the object library up to and including each model stored in the object library; and determine a similarity score for each of the 3D models of pairs of eyeglasses in the first set based, at least in part, on a comparison of the first outline to the respective second outline for each of the 3D models of pairs of eyeglasses in the first set.

In some such embodiments, a ranked listing of the 3D models of pairs of eyeglasses in the first set may be determined based, at least in part, on their respective similarity scores. In other embodiments, there may be presented, on a display of the device, at least a part of the ranked listing of the 3D models of pairs of eyeglasses in the first set and then receive, e.g., via the device's user interface, a selection of a first one of the 3D models of pairs of eyeglasses in the first set. In such embodiments, the device may also present a view of an avatar representing the first subject, wherein the avatar is wearing the selected first one of the 3D models of pairs of eyeglasses.

In other embodiments, comparing the first outline to a respective second outline for each of the 3D models of pairs of eyeglasses in the first set may comprise: aligning the first outline and the second outline for the respective 3D model of pairs of eyeglasses in the first set; and then estimating the area (e.g., in terms of a total number of pixels) between the first outline and the aligned second outline for the respective 3D model.

In other embodiments, determining the first outline of the first pair of eyeglasses may comprise: obtaining a first masked region from the first image, wherein the first masked region comprises an indication of pixels from the first image determined to be part of a frame of the first pair of eyeglasses; extracting a set of edge pixels from the first masked region; placing the set of edge pixels over a grid comprising a plurality of cells; determining a center of mass of edge pixels located within each cell of the grid; and then determining the first outline of the first pair of eyeglasses as an ordered list of key points, wherein the key points comprise the centers of mass of cells of the grid containing edge pixels representing an outer edge of the frame of the first pair of eyeglasses.

In other embodiments, determining the second outline for each of a first set of the first plurality of 3D models of pairs of eyeglasses in the object library may comprise, for each 3D model of pairs of eyeglasses in the first set: extracting a set of edge pixels from the respective 3D model, as oriented in a specified view; placing the set of edge pixels over a grid comprising a plurality of cells; determining a center of mass of edge pixels located within each cell of the grid; and then determining the second outline of the respective 3D model as an ordered list of key points, wherein the key points comprise the centers of mass of cells of the grid containing edge pixels representing an outer edge of the frame of the respective 3D model of pair of eyeglasses.

In still other embodiments, a device is disclosed, comprising: a memory; an image capture device; and one or more processors operatively coupled to the memory, wherein the one or more processors are configured to execute instructions causing the one or more processors to: obtain a first image captured by the image capture device, wherein the first image comprises a first object of interest; determine a first outline of the first object of interest; obtain an object library, wherein the object library comprises a first plurality of three-dimensional (3D) models of variants of the first object of interest; determine a second outline for each of a first set of the first plurality of 3D models of variants of the first object of interest; and then determine a similarity score for each of the 3D models of variants of the first object of interest in the first set based, at least in part, on a comparison of the first outline to the respective second outline for each of the 3D models of variants of the first object of interest in the first set.

In some such embodiments, a ranked listing of the 3D models of variants of the first object of interest in the first set may be determined based, at least in part, on their respective similarity scores. In other embodiments, there may be presented, on a display of the device, at least a part of the ranked listing of the 3D models of variants of the first object of interest in the first set and then receive, e.g., via the device's user interface, a selection of a first one of the 3D models of variants of the first object of interest in the first set. In such embodiments, the device may also present a view of an avatar representing the first subject, wherein the selected first one of the 3D models of variants of the first object of interest is presented in conjunction with the avatar.

Various NPSD embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

A physical environment, as used herein, refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

According to some embodiments described herein, each user of an avatar customization system can construct an individualized avatar to associate with his or her virtual identity, for example, through an avatar editing environment. The user can select and modify the facial features, hairstyles, skin tones, clothes, accessories, etc. (collectively referred to as "elements") for his or her avatar and also specify colors, shapes, and/or styles for each of their avatar's elements. Once the user has specified various aspects of his or her individual avatar, the avatar definition data can be stored and recalled for rendering the avatar in various virtual environments, such as in online chat sessions, Internet forums, personal blogs, interactive games, address books, calendars, and so on.

An individualized avatar can resemble the user that it represents in terms of appearance and fashion. However, in conventional systems, the various elements of each user's avatar may have to be selected manually from large "libraries" of virtual object elements, which may be tedious and/or present difficulties to the user in terms of locating the virtual object elements that most closely mimic their actual facial expressions, appearances, body language, and/or accessories that they may exhibit in different situations and circumstances. Although users can also select generic (or even randomly-generated) elements to customize their avatars, such generic and/or randomly-generated elements may not accurately reflect the individuality in each user's appearance, style, and/or preferred accessories.

Thus, there is a need for devices, methods, and non-transitory program storage devices (NPSDs) to provide users with more intelligent and automated matching of objects of interest (e.g., eyeglasses frames), as identified in 2D enrollment images of a user, when determining particular 3D object models to suggest for use during the creation and/or customization of a 3D avatar for the user.

Exemplary System for Eyeglasses Frame Matching in Captured Images

Figure 1A:
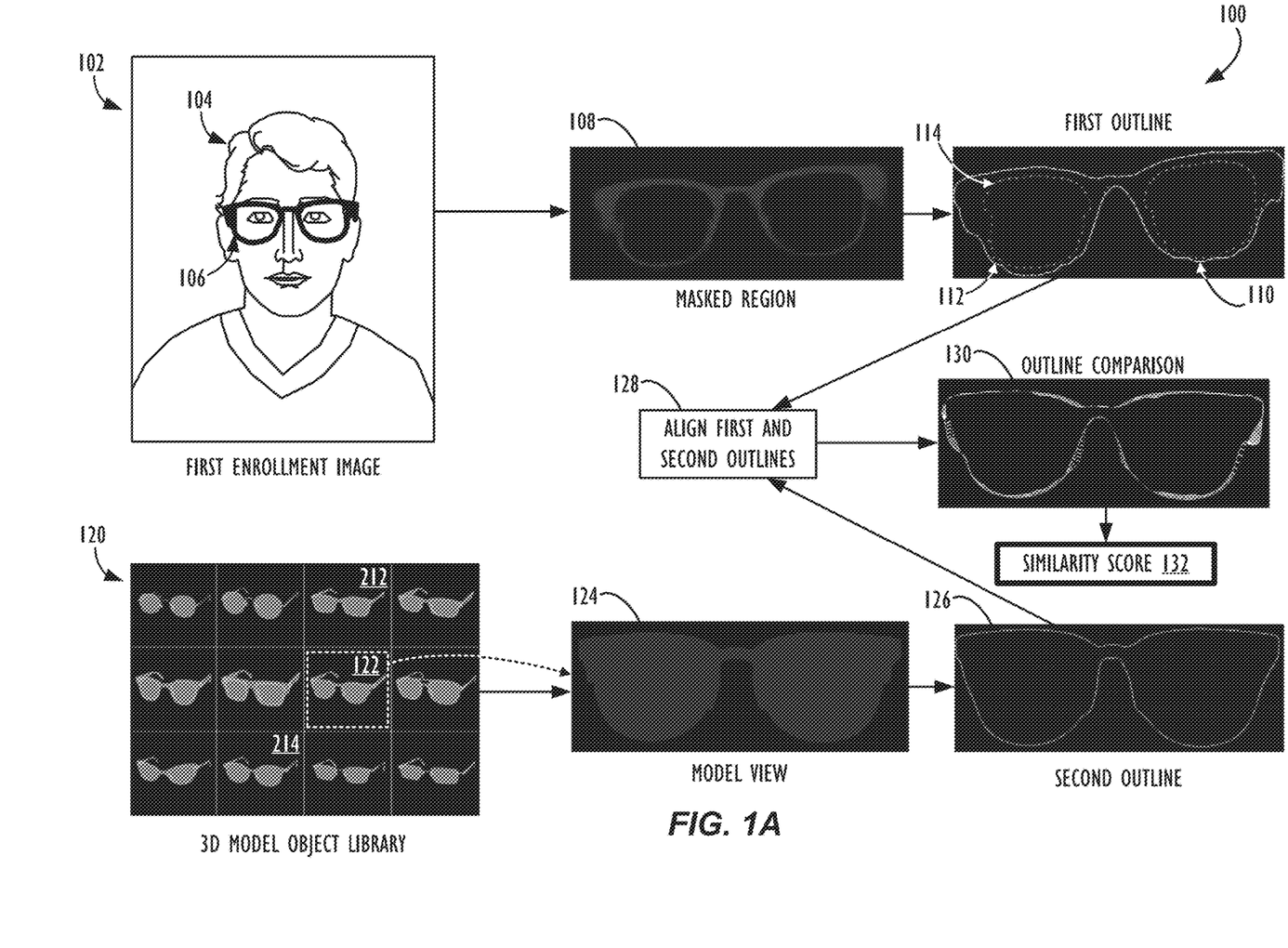
FIG. 1A illustrates an exemplary system for eyeglasses frame matching in enrollment images, according to one or more embodiments.

Turning now to FIG. 1A, an exemplary system 100 for eyeglasses frame matching in enrollment images is illustrated, according to one or more embodiments. Note: Although the examples and embodiments described herein are primarily in the context of matching an eyeglasses frame that is detected in a captured image, it is to be understood that analogous techniques to those described herein may similarly be employed to detect and match any type of object of interest found in a captured image (and for which the system has an object model library). Exemplary first enrollment image 102 comprises a human subject 104 wearing a first pair of eyeglasses 106. Exemplary first enrollment image 102 may be captured, e.g., by an image capture device (e.g., webcam, camera, or the like) of an electronic device at any point in time, such as when a user is enrolling in a new system, app, game, or online community that utilizes 3D avatars, or when the user desires to update their avatar for a respective system, app, game, or online community. Alternately, a previously-captured image of the user may be used, e.g., from a stored photo library.

In some embodiments, one or more computer vision (CV) and/or other machine learning (ML)-enabled object detection algorithms may be applied to the enrollment image 102, in order to identify one or more objects of interest. In the example of system 100, the objects of interest are eyeglasses frames, and an object detection algorithm in this example has produced a masked region 108, wherein the light-colored pixels in masked region 108 represent pixels determined by the algorithm to be part of a frame of a first pair of eyeglasses identified in the enrollment image 102. In other embodiments, of course, masked regions may be produced indicating the pixels in the captured image that are determined to be a part of whatever type of object is of interest to the given application (e.g., an object other than a pair of eyeglasses, such as a cup or mug). In this example 100, a front facing view of the pair of eyeglasses is expected, but other views of the object of interest may also be acceptable, as long as the 3D model objects it is compared against are oriented into a similar view, such that a valid similarity score may be determined for the 3D model object.

Once the pixels determined to be part of a frame of the first pair of eyeglasses are identified in masked region 108, a first outline 110 may be generated for the first pair of eyeglasses. In some embodiments, it may be desirable to create a simple outline of an outer edge of the object of interest, e.g., with the outline comprising an ordered list of key points appearing on a grid. As will be discussed below, creating an ordered list of key points for the outlines of the two aligned shapes (i.e., an outline of the detected object of interest in the image and an outline of a candidate matching 3D model of the object of interest from an object library), wherein, e.g., the outlines may be in the form of Catmull-Rom splines, other types of curves, connected line segments, or the like, may allow for an easier computation of the amount of area between the two outlines, with a smaller area between two outlines indicating a more precise matching in outline shape between two objects. For example, in this case, the 2D representation of the object of interest in the enrollment image will be compared to a specified view of a respective 3D model of a variant of the object of interest in a 3D model object library.

As will be explained in greater detail below with reference to FIG. 1B, in some embodiments, the process of determining the first outline of the first pair of eyeglasses may comprise: extracting a set of edge pixels from the first masked region 108 (e.g., using any desired edge detection algorithm, e.g., Sobel edge detection); placing the set of edge pixels over a grid comprising a plurality of cells; determining a center of mass of edge pixels located within each cell of the grid (wherein the density of the cells in the grid with respect to the size of the mask region representing the first pair of eyeglasses may be customized, e.g., based on how fine or coarse of an object outline is needed for a given implementation); and then determining an ordered list of key points (112), wherein the key points comprise the centers of mass of the cells of the grid containing edge pixels representing an outer edge of the frame of the first pair of eyeglasses.

In some embodiments, determining an outer edge of the object of interest (i.e., as opposed to an inner edge) may be an important consideration, e.g., such that only the silhouette of the object of interest is matched against the silhouettes of objects in the 3D model object library, while inner edges (e.g., the inner edges 114 identified around the lenses of the eyeglass frames in masked region 108) may be ignored.

Figure 1B:
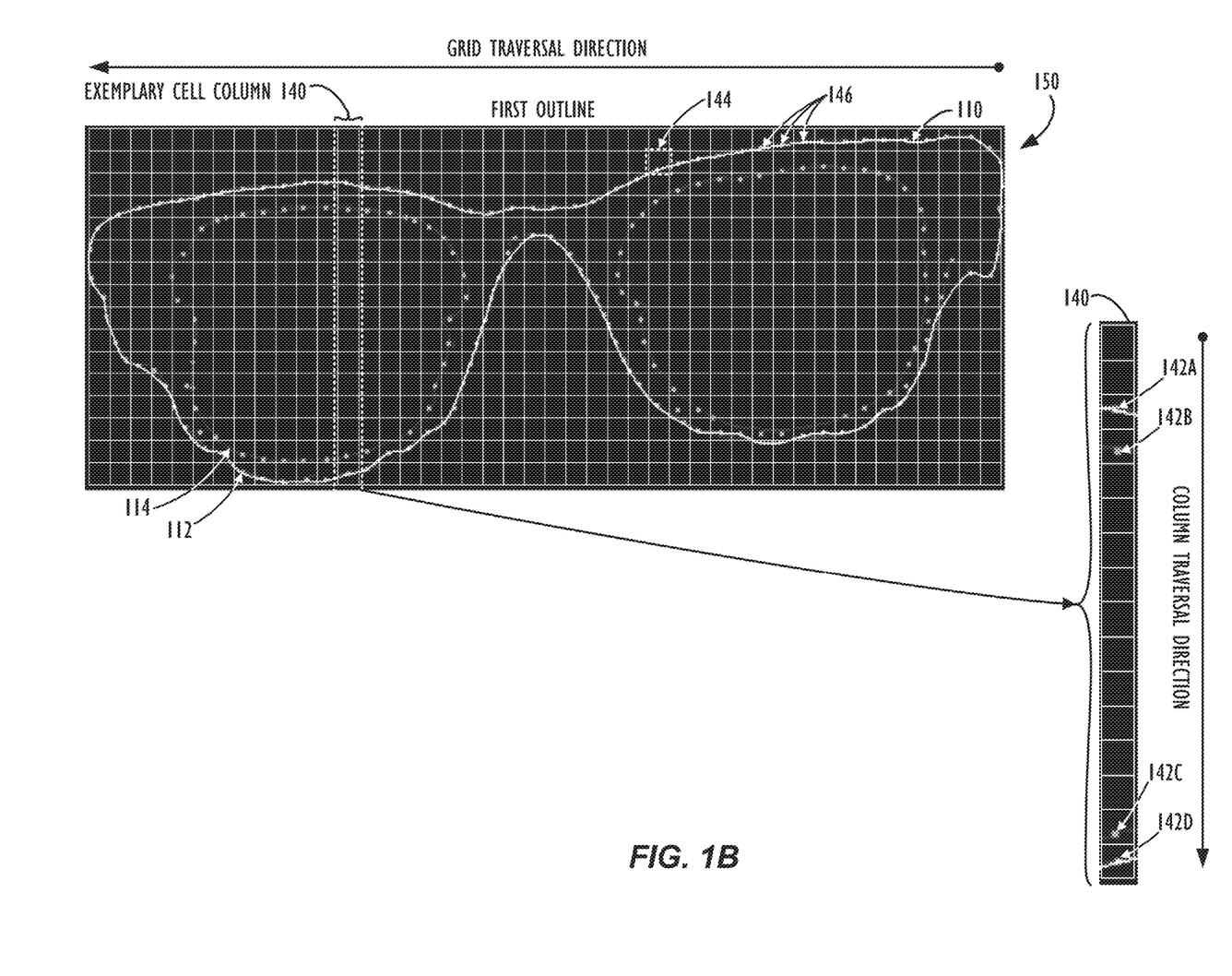
FIG. 1B illustrates an exemplary edge detection process for eyeglasses frames, according to one or more embodiments.

For example, turning now to FIG. 1B, an exemplary edge detection process for eyeglasses frames is illustrated, according to one or more embodiments. In some such edge detection processes, each of the columns of cells (e.g., exemplary cell column 140) in the grid 150 may be traversed in a particular direction, such as traversing the columns from right to left across the grid, and then traversing the cells (e.g., exemplary cell 144) within each individual column from top to bottom, as illustrated by the two exemplary traversal direction arrows in FIG. 1B. When traversing the cells within an individual cell column, the first center of mass pixel (e.g., the exemplary pixels 146 represent center of mass pixels for the edge pixels located within their respective cells) found closest to the top of a given column of cells (e.g., center of mass pixel 142A in the blown-out view of exemplary cell column 140 in FIG. 1B) may be deemed a "top" outer edge pixel, and the last center of mass pixel found closest to the bottom of a given column of cells (e.g., center of mass pixel 142D in the blown-out view of exemplary cell column 140 in FIG. 1B) may be deemed a "bottom" outer edge pixel. The other center of mass pixels identified in a given column (e.g., center of mass pixels 142B and 142C in the blown-out view of exemplary cell column 140 in FIG. 1B) may then be ignored, as likely being representative of an inner edge of the object of interest detected in the image (e.g., an outline of a lens, in the case of a pair of eyeglasses).

Figure 1C:
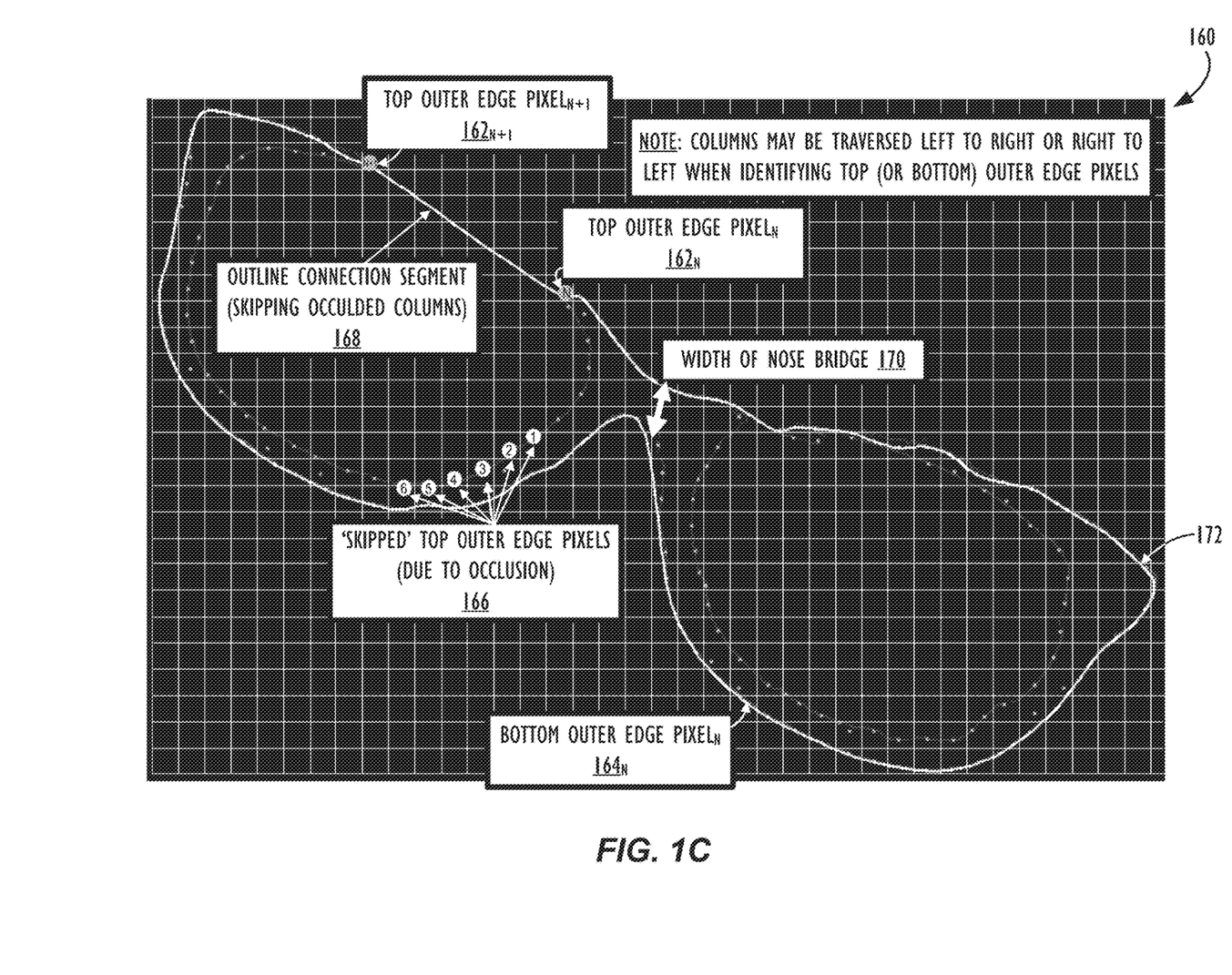
FIG. 1C illustrates an exemplary edge occlusion detection process for eyeglasses frames, according to one or more embodiments.

In some cases, one or more other object-specific heuristics may also be employed in the object of interest outline determination process. Turning now to FIG. 1C, an exemplary edge occlusion detection process 160 for eyeglasses frames is illustrated, according to one or more embodiments. In some such edge occlusion detection processes, if the "top" outer edge pixel 162 and the "bottom" outer edge pixel 164 for a given column of cells are closer together than a predetermined threshold minimum distance (e.g., closer than the estimated width of the nose bridge 170, in the case of a pair of eyeglasses), there may be adjudged to be an occlusion (e.g., a user's hair covering all or a portion of an outer edge of their eyeglasses frame) in either the top and/or bottom edge of the given column of the grid upon which the object mask has been laid.

In some cases, if an occlusion is adjudged, the ordered list of key points (e.g., an ordered listing of coordinate points, proceeding in a clockwise or counterclockwise direction around the object's outline 172 that is being determined) representing the object outline may simply not identify a valid respective "top" outer edge pixel (or "bottom" outer edge pixel) for the given column(s) having the adjudged occlusion(s) and then connect the previous valid top (or bottom) key point to the next column having a valid top (or bottom) key point in the object's outline in the direction of the ordered list. It is to be understood that, for columns wherein a valid "top" outer edge pixel (or "bottom" outer edge pixel) is identified (e.g., there is no occlusion detected in the column), the process may simply continue traversing the center of mass pixels, in a column-by-column fashion, to establish an ordered relationship between those key points and to form the estimated object outline 172.

For example, as shown in FIG. 1C example 160, a number of identified "top" outer edge center of mass pixels in consecutive columns within the grid (labeled with indices 1-6) have been identified as occlusion pixels 166 (e.g., due to being determined to be too close to the corresponding "bottom" outer edge pixel in their respective cell columns), and thus have been skipped over in the creation of the eyeglasses frame object outline 172. An example of an occlusion occurring in an image containing eyeglasses may be some of the user's hair falling over their forehead and covering a portion of the eyeglasses frame. Assuming the columns in the grid shown in example 160 are being traversed in a right-to-left manner when identifying the top outer edge pixels of the eyeglasses frame object, then the previous valid top key point (i.e., top outer edge pixel N, $162_N$ in FIG. 1C) may simply be connected to the next column having a valid top key point (i.e., top outer edge pixel N+1, $162_{N+1}$ in FIG. 1C) in the eyeglasses frame object's outline, e.g., using outline connection segment 168 (which may comprise, e.g., a rectilinear line segment, curve, or other desired type of connection). It is to be understood that, since outline connection segment 168 happens to connect center of mass pixels from non-adjacent columns (i.e., due to the presence of occlusion pixels 166) the outline 172 may not track the exact shape of the eyeglasses frame object's outline over this region of the frame, but it may provide a close approximation to the object's true outline and allow the overall object outline to be completed. An analogous process may be followed to identify and connect the "bottom" outer edge pixels 164 of the object outline in the ordered list of key points representing the object's outline, including the skipping over of any columns identified to have an occlusion present over the bottom outer edge of the object. (It is to be understood that, in other implementations, additionally or alternatively, a list of "left" outer edge pixels and "right" outer edge pixels may also be determined and included at the appropriate location within the ordered list of key points representing the object's outline.)

Of course, if there are too many columns (and/or rows) with adjudged occlusions 166 for an accurate enough object outline of the object of interest to be made, the process may simply exit and/or request that the user capture a replacement first enrollment image with less occlusion. A determination that a sufficiently accurate object outline cannot be identified for a given object may be made if, e.g.: (1) the total number of pixels in the masked region 108 is below a first threshold amount (which may, e.g., indicate that the subject is either wearing no eyeglasses or is wearing frameless eyeglasses); or (2) the difference between the number or key points identified to the right and to the left of the center point of the eyeglasses (e.g., represented by the estimated nose bridge location 170) is larger than a second threshold amount (which may, e.g., indicate either occlusions on one side of the subject's face or that the subject's head is turned too far to one side in the enrollment image to obtain a desired, e.g., frontal, view of the eyeglasses frames).

In other embodiments, however, it is to be understood that the matching operation may consider more than just the outer edges of the objects of interest and the corresponding views of the 3D models in the object library, as well, if so desired. In those cases, the first outline of the object of interest may contain any and all edges that are of interest to a given matching operation (e.g., in the case of matching coffee mugs identified in an image, the shape of the coffee mug inside the handle may also be relevant to finding the best-matching coffee mug 3D model from an object library, as opposed to just the outer silhouette of the coffee mug).

Turning back now to FIG. 1A and 3D model object library 120, various 3D models of eyeglass frames are illustrated. In some embodiments, a second outline may be determined for each of a first set of one or more of the first plurality of 3D models of pairs of eyeglasses in the object library (in other words, a second outline does not need to be determined for each and every 3D model in the library, e.g., if some can be filtered out based on size, type of object, user region, user gender, etc., such that outlines need only be determined for a set of the 3D models in the library). In example 100, the 3D model for the pair of eyeglasses labeled 122 is examined in further detail, for illustrative purposes. In particular, a first model view 124 for eyeglasses model 122 may be created, e.g., with the eyeglasses oriented in a specified view. In this example, the 2D representation of the eyeglasses identified in the first enrollment image are likely to be oriented in a frontal view, so the eyeglasses model 122 may also be oriented in a frontal view for the generation of first model view 124.

Next, a second outline 126 may be created for the first model view 124, e.g., following an outline generation process similar to that described above with regard to the generation of the first outline 110 for the masked region 108. In particular, for each 3D model of pairs of eyeglasses in the first set, a second outline may be generated for the respective 3D mode by: extracting a set of edge pixels from the respective 3D model, as oriented in a specified view; placing the set of edge pixels over a grid comprising a plurality of cells; determining a center of mass of edge pixels located within each cell of the grid; and then determining an ordered list of key points, wherein the key points comprise the centers of mass of cells of the grid containing edge pixels representing an outer edge of the frame of the respective 3D model of pair of eyeglasses.

Once a first outline has been determined for the first pair of eyeglasses and second outline has been determined for each 3D model of pair of eyeglasses in the first set, at block 128, each respective second outline may be aligned with the first outline so that they may be compared to one another and a similarity score may be determined for the respective 3D model from the first set. In some cases, aligning the first outline and a respective second outline may comprise: aligning the key points comprising the first outline and the second outline for the respective 3D model of pairs of eyeglasses in the first set. The alignment operation may involve translating, rotating, and/or scaling the first outline, as necessary, so that a valid comparison to a respective second outline may be made. In still other cases, an Iterative Closest Point (ICP)-style algorithm may be employed to quickly align the two outline shapes.

Next, as shown at block 130, the aligned first and second outlines may be compared to one another and a similarity score may be determined at block 132. In some implementations, determining the similarity score between two aligned outlines may comprise estimating the area (e.g., in terms of a number of pixels) between the first outline and the aligned second outline for the respective 3D model. As may now be understood, the smaller the number of pixels there are between the first outline and the respective second outline, the more similar the respective 3D model is to the pair of eyeglasses being worn by the user in the enrollment image.

Figure 2:
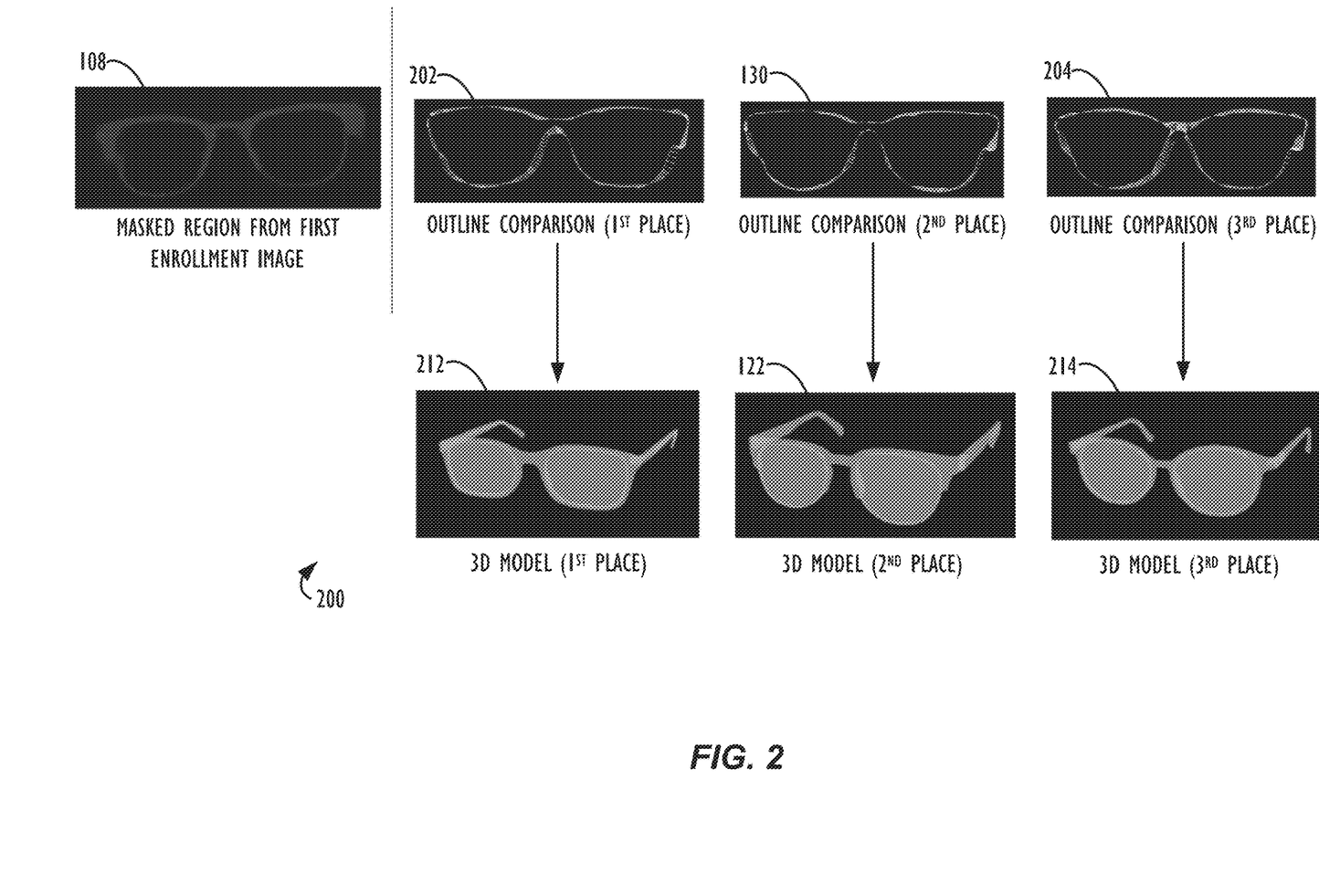
FIG. 2 illustrates an exemplary ranked listing of 3D model objects matched to an object identified in an enrollment image, according to one or more embodiments.

Turning now to FIG. 2, an exemplary ranked listing 200 of 3D model objects matched to an object identified in an enrollment image (in this example, a first pair of eyeglasses, represented by masked region 108) is illustrated, according to one or more embodiments. In this example, the outline comparison 130 discussed above with respect to FIG. 1A (i.e., between first outline 110 and second outline 126, which was based on 3D model 122) turns out to have the second smallest area between first outline and respective second outline, and, thus, the corresponding 3D model of pair of eyeglasses 122 is deemed to be the second place 3D model. The outline comparison 202 (i.e., between first outline 110 and a second outline based on 3D model 212) turns out to have the smallest area between first outline and respective second outline, and, thus, the corresponding 3D model of pair of eyeglasses 212 is deemed to be the first place, or best-matching, 3D model of eyeglasses. In some embodiments, then, eyeglasses model 212 might be suggested to a user for inclusion in conjunction with their avatar, based on masked region 108 being identified in their enrollment image. Finally, exemplary outline comparison 204 (i.e., between first outline 110 and a second outline based on 3D model 214) turns out to have the third smallest area between first outline and respective second outline, and, thus, the corresponding 3D model of pair of eyeglasses 214 is deemed to be the third place 3D model of eyeglasses.

It is to be understood that, in some embodiments, all or a part of the list of ranked 3D models may be presented to a user for selection, e.g., via a user interface. A user would not be obligated to select the best-matching 3D model for inclusion with their avatar, and, in some instances, a user could opt to manually browse a 3D model object library and select a 3D object of their choosing (or at random) for inclusion in conjunction with their avatar.

Exemplary Methods for Eyeglasses Frame Matching in Captured Images

Figure 3A:
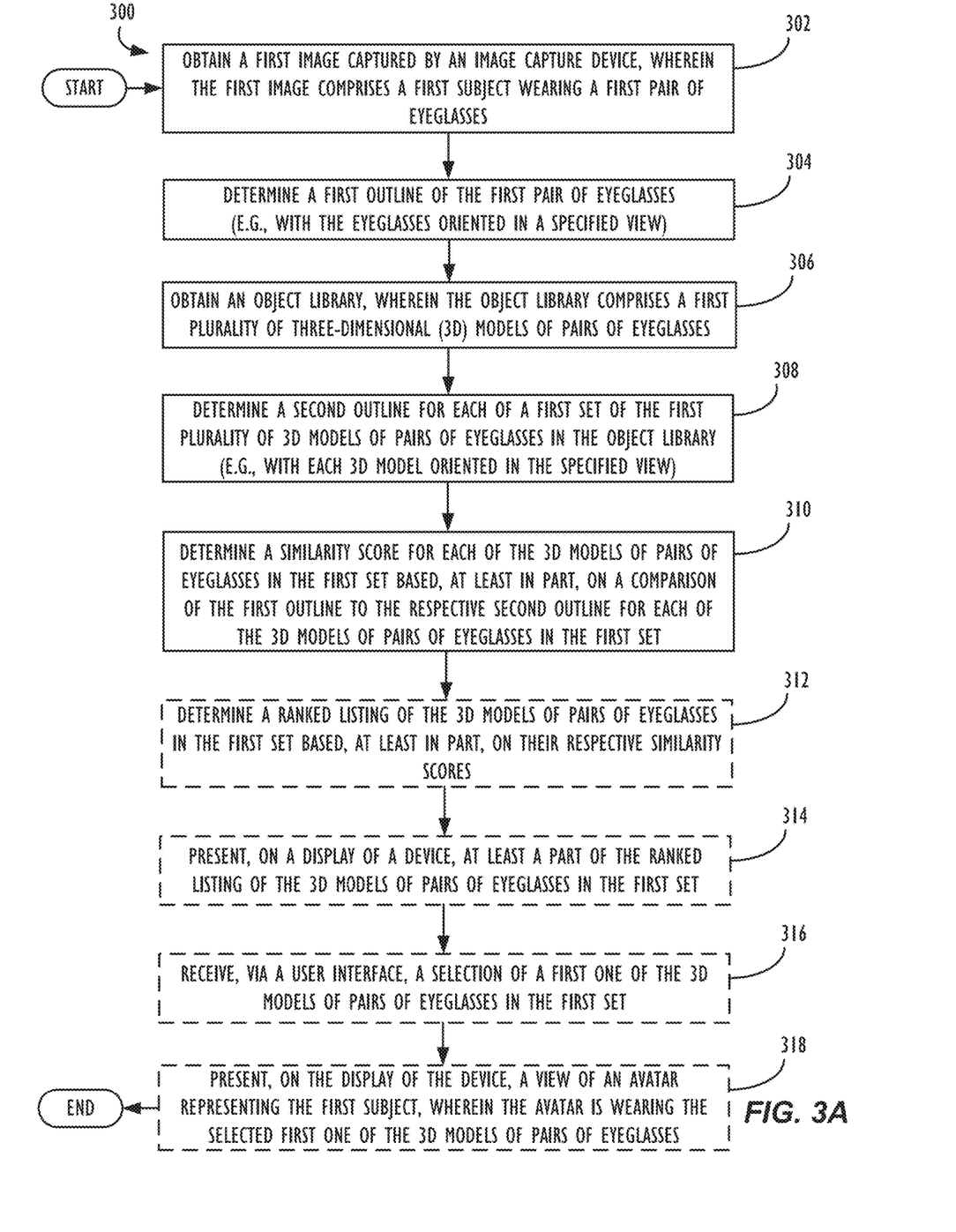
FIGS. 3A-3D are flow charts illustrating methods of performing eyeglasses frame matching in enrollment images, according to various embodiments.

FIGS. 3A-3D are flow charts illustrating methods of performing eyeglasses frame matching in captured images, e.g., avatar enrollment images, according to various embodiments. Turning first to FIG. 3A, a method 300 begins at block 302 by obtaining a first image captured by an image capture device, e.g., in the form of an avatar enrollment image, wherein the first image comprises a first subject wearing a first pair of eyeglasses. In some embodiments, the method 300 may determine that there is greater than or equal to a threshold amount of occlusion in the first pair of eyeglasses as captured in the first image; and, if so, obtain a replacement first image captured by the image capture device, wherein the replacement first image comprises the first subject wearing the first pair of eyeglasses, wherein there is less than the threshold amount of occlusion in the first pair of eyeglasses as captured in the replacement first image, and wherein the first outline of the first pair of eyeglasses is determined from a representation of the first pair of eyeglasses captured in the replacement first image. It is to be understood that the replacement image capture process may be repeated as necessary (or desired), e.g., until less than the threshold amount of occlusion is detected in the first pair of eyeglasses. It is also to be understood that, in images in which a pair of eyeglasses is not detected with sufficient confidence, the remaining steps of method 300 may simply be skipped and/or replaced with a more manual process of allowing a user to select from among a library of 3D object models of pairs of eyeglasses (or other type of object of interest) for any such 3D object model that they may want to include on their avatar (e.g., even if the user does not wear eyeglasses in real life).

Next, at block 304, the method 300 may determine a first outline of the first pair of eyeglasses (e.g., with the eyeglasses oriented in a specified view, such as a front view, back view, side view, isometric view, etc.). Next, at block 306, the method 300 may obtain an object library, wherein the object library comprises a first plurality of three-dimensional models of pairs of eyeglasses (e.g., as illustrated in 3D model object library 120 of FIG. 1A). At block 308, the method 300 may determine a second outline for each of a first set of one or more of the first plurality of 3D models of pairs of eyeglasses in the object library (e.g., with each 3D model oriented in the specified view, i.e., in the same oriented view as the first outline was created from the first pair of eyeglasses), up to and including each of the relevant 3D object models in the object library.

Next, at block 310, the method 300 may determine a similarity score for each of the 3D models of pairs of eyeglasses in the first set based, at least in part, on a comparison of the first outline to the respective second outline for each of the 3D models of pairs of eyeglasses in the first set. In some implementations, the method 300 may also: determine a ranked listing of the 3D models of pairs of eyeglasses in the first set based, at least in part, on their respective similarity scores (block 312); present, on a display of a device, at least a part of the ranked listing of the 3D models of pairs of eyeglasses in the first set, e.g., as illustrated in FIG. 2 (block 314); receive, via a user interface, a selection of a first one of the 3D models of pairs of eyeglasses in the first set (block 316); and/or present, on the display of the device, a view of an avatar representing the first subject, wherein the avatar is wearing the selected first one of the 3D models of pairs of eyeglasses (block 318). As desired, the user may return to block 302 (e.g., to capture a new image from which to generate and/or customize their avatar); block 314 (e.g., to see and/or select from the ranked listing of 3D models again); and/or other steps in the process of method 300, e.g., anytime the additional modification or customization of objects presented in conjunction with their avatar is desired.

Figure 3B:
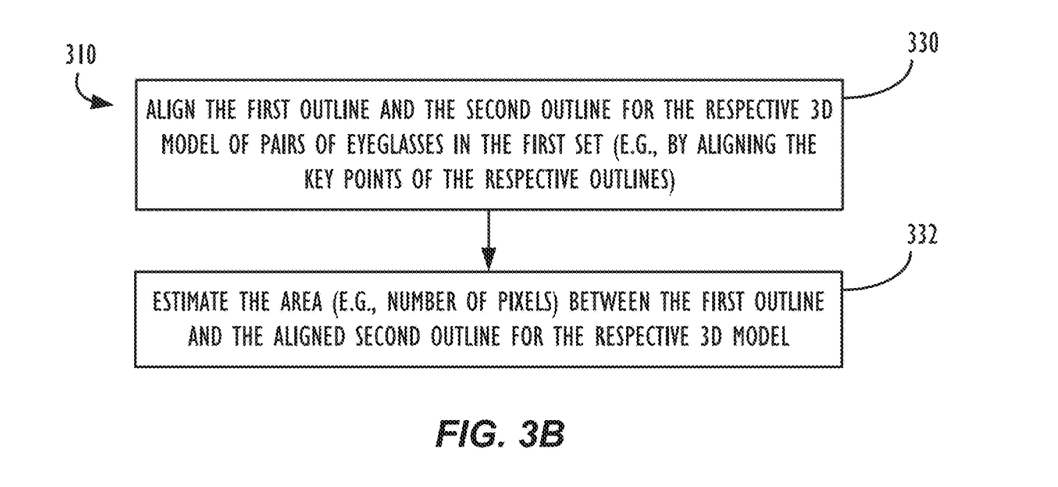

Turning now to FIG. 3B, a flow chart is shown, illustrating additional details of performing block 310 of method 300. In particular, at block 330, the comparison of the first outline to a respective second outline for each of the 3D models of pairs of eyeglasses in the first set may further comprise: aligning the first outline and the second outline for the respective 3D model of pairs of eyeglasses in the first set (e.g., by aligning the key points of the respective outlines). The alignment at step 330 may involve translating, rotating, and/or scaling the first outline, as necessary, so that a valid comparison to a respective second outline may be made. Next, at block 332, the method 300 may estimate the area (e.g., in terms of a number of pixels) between the first outline and the aligned second outline for the respective 3D model. In some embodiments, the area between the first outline and a respective second outline may be divided into a plurality of parallelograms, which parallelograms may be divided into pairs of triangles, such that the areas of each pair of triangles may be efficiently calculated and summed across the entire area between the first and second outlines. As may be understood, a smaller area (e.g., a smaller number of total pixels) between the first and second outlines reflects a stronger shape match between the first pair of eyeglasses and the particular 3D model represented by the respective second outline, while a larger area (e.g., a larger number of total pixels) between the first and second outlines reflects a poorer shape match between the first pair of eyeglasses and the particular 3D model represented by the respective second outline.

Figure 3C:
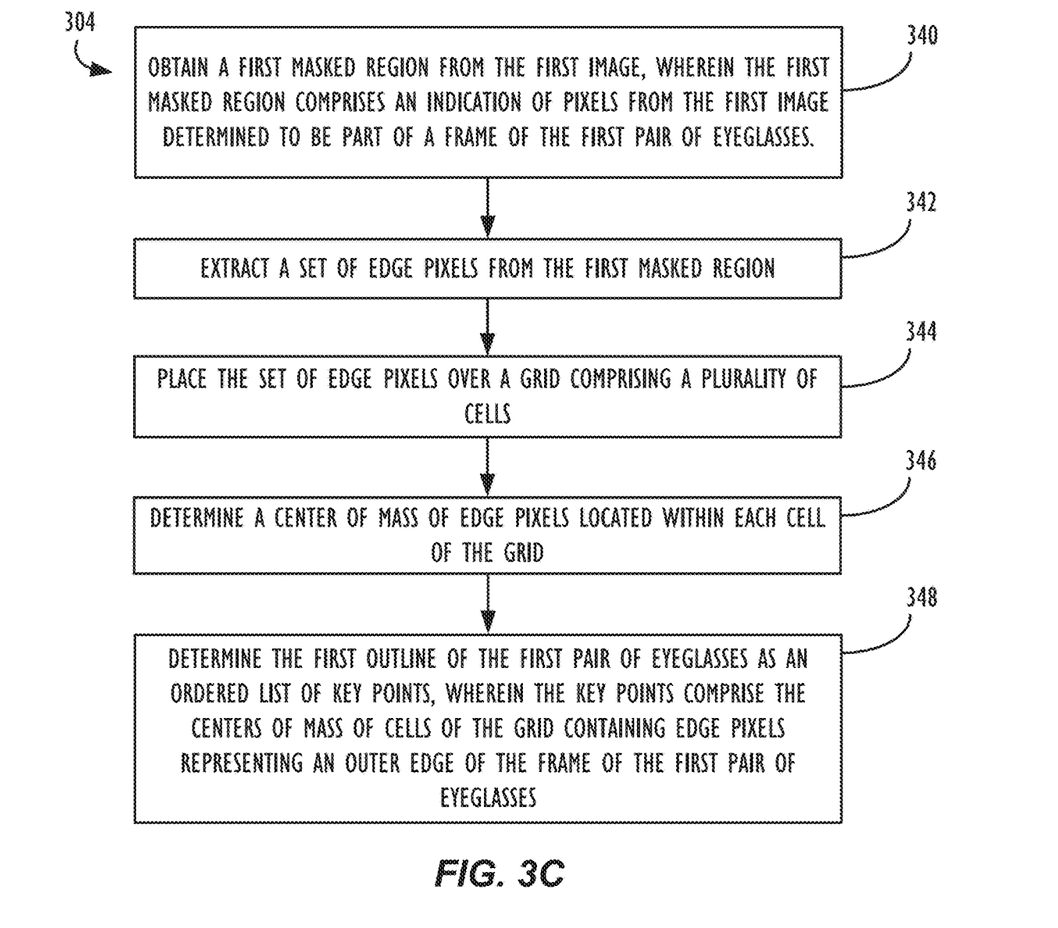

Turning now to FIG. 3C, a flow chart is shown, illustrating additional details of performing block 304 of method 300. In particular, the determination of the first outline of the first pair of eyeglasses may further comprise: obtaining a first masked region from the first image (e.g., such as masked region 108 illustrated in FIG. 1A), wherein the first masked region comprises an indication of pixels from the first image determined to be part of a frame of the first pair of eyeglasses (block 340); extracting a set of edge pixels from the first masked region (block 342); placing the set of edge pixels over a grid comprising a plurality of cells (block 344); determining a center of mass of edge pixels located within each cell of the grid (block 346); and determining the first outline of the first pair of eyeglasses as an ordered list of key points, wherein the key points comprise the centers of mass of cells of the grid containing edge pixels representing an outer edge of the frame of the first pair of eyeglasses (block 348).

Figure 3D:
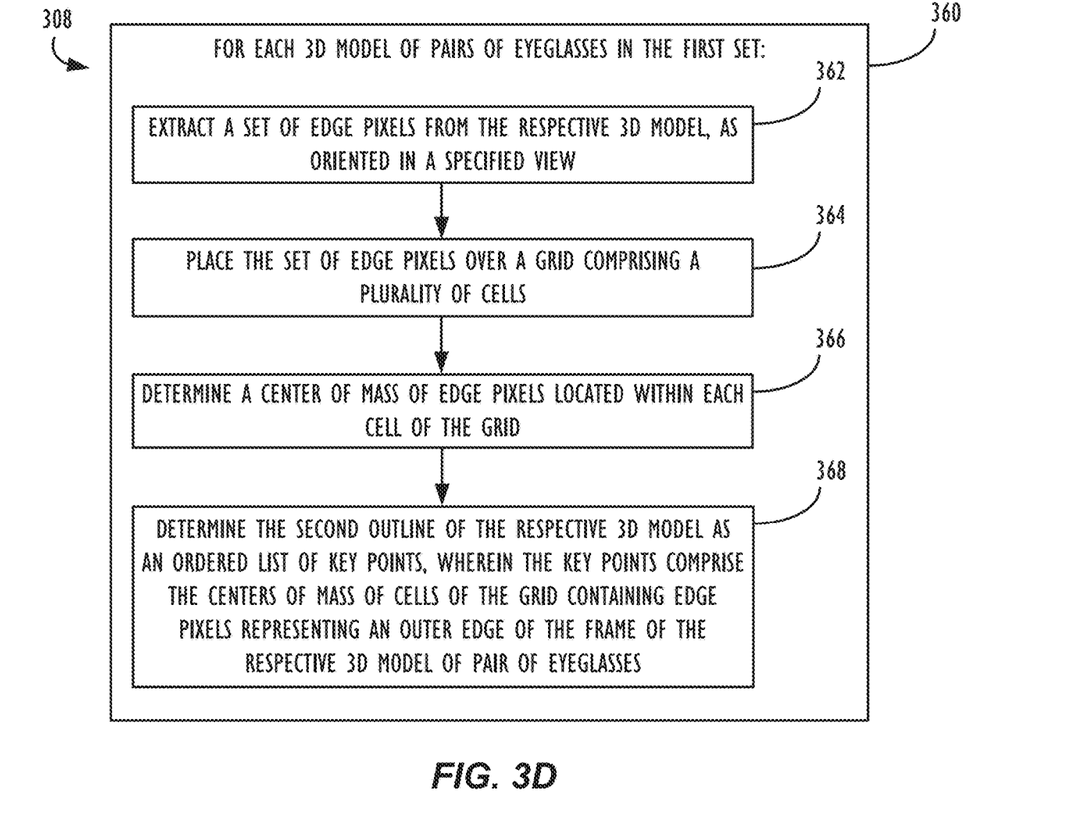

Turning now to FIG. 3D, a flow chart is shown, illustrating additional details of performing block 308 of method 300. In particular, at block 360, the determination of the second outline for each of a first set of the first plurality of 3D models of pairs of eyeglasses in the object library (e.g., such as second outline 126 illustrated in FIG. 1A) may further comprise, for each 3D model of pairs of eyeglasses in the first set: extracting a set of edge pixels from the respective 3D model, as oriented in a specified view (block 362); placing the set of edge pixels over a grid comprising a plurality of cells (block 364); determining a center of mass of edge pixels located within each cell of the grid (block 366); and determining the second outline of the respective 3D model as an ordered list of key points, wherein the key points comprise the centers of mass of cells of the grid containing edge pixels representing an outer edge of the frame of the respective 3D model of pair of eyeglasses (block 368).

Exemplary Methods for Object of Interest Matching in Captured Images

Figure 4:
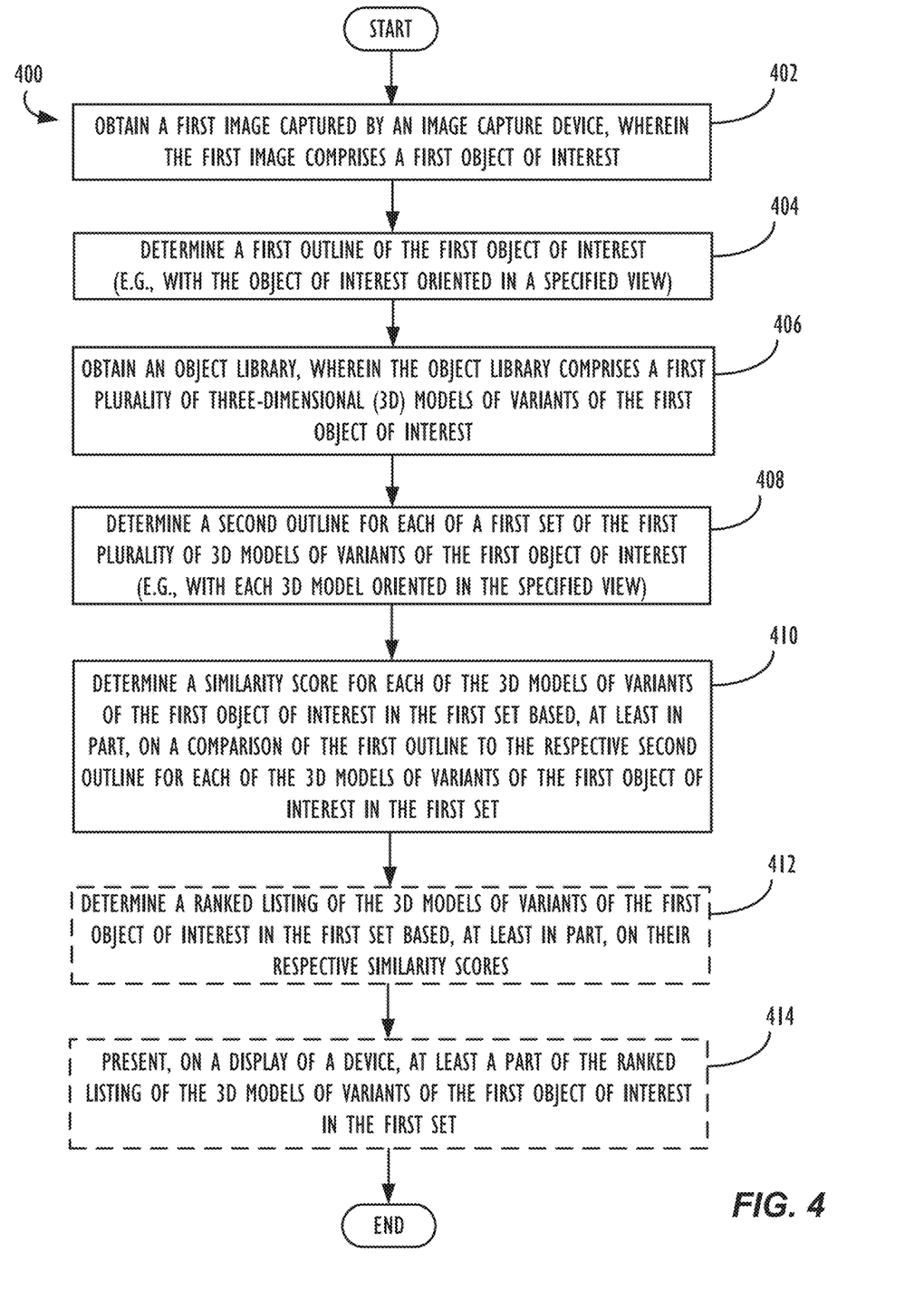
FIG. 4 is a flow chart illustrating a method of performing object of interest matching in images, according to various embodiments.

Turning now to FIG. 4, a flowchart illustrating a method 400 of performing object of interest matching in captured images, e.g., avatar enrollment images, is shown, according to various embodiments. Method 400 may begin at block 402 by obtaining a first image captured by an image capture device, wherein the first image comprises a first object of interest. As may be understood, the object of interest may be any type of detectable object in a captured image (i.e., other than a pair of eyeglasses), and there does not need to be a human subject present in the captured image in order for method 400 to be performed. In other words, a 3D object model matching a 2D representation of the object in a captured image may be presented to a user for selection, whether or not it is being selected for presentation in conjunction with an avatar or other representation of a human subject. Next, at block 404, the method 400 may determine a first outline of the first object of interest (e.g., with the object of interest oriented in a specified view).

Next, at block 406, the method 400 may obtain an object library, wherein the object library comprises a first plurality of 3D models of variants of the first object of interest. For example, if the object of interest identified in the image in a particular example is a coffee mug, then the object library that is obtained may comprise a plurality of variants of coffee mug shapes and sizes, which may later be compared with the coffee mug identified in the image in order to determine respective similarity scores for a first set of coffee mug object model variants.

Next, at block 408, the method 400 may determine a second outline for each of a first set of the first plurality of 3D models of variants of the first object of interest (e.g., with each 3D model oriented in the specified view). At block 410, the method 400 may determine a similarity score for each of the 3D models of variants of the first object of interest in the first set based, at least in part, on a comparison of the first outline to the respective second outline for each of the 3D models of variants of the first object of interest in the first set. For example, similar outline comparison and similarity score determination techniques to those described above in the context of pairs of eyeglasses may also be employed to determine similarity scores between any desired objects of interest identified in images and corresponding 3D model variants.

Finally, in some implementations, the method 400 may determine a ranked listing of the 3D models of variants of the first object of interest in the first set based, at least in part, on their respective similarity scores (block 412) and/or present, on a display of a device, at least a part of the ranked listing of the 3D models of variants of the first object of interest in the first set (block 414). Upon selection of one or more of the variants of the first object of interest presented to the user, and if so desired, the method 400 may also present, e.g., on the display of the device, a view of an avatar representing the first subject (if desired), wherein the avatar is presented in conjunction with the selected one or more variants of the first object of interest.

It is to be understood that the various blocks described above in the context of the flowcharts in FIGS. 3A-3D and FIG. 4 may be performed in different orders to suit a given implementation and need not be performed in the specific order shown in the Figures. Additionally, one or more blocks may optionally be performed in some embodiments and omitted in other embodiments.

Exemplary Electronic Computing Devices

Figure 5:
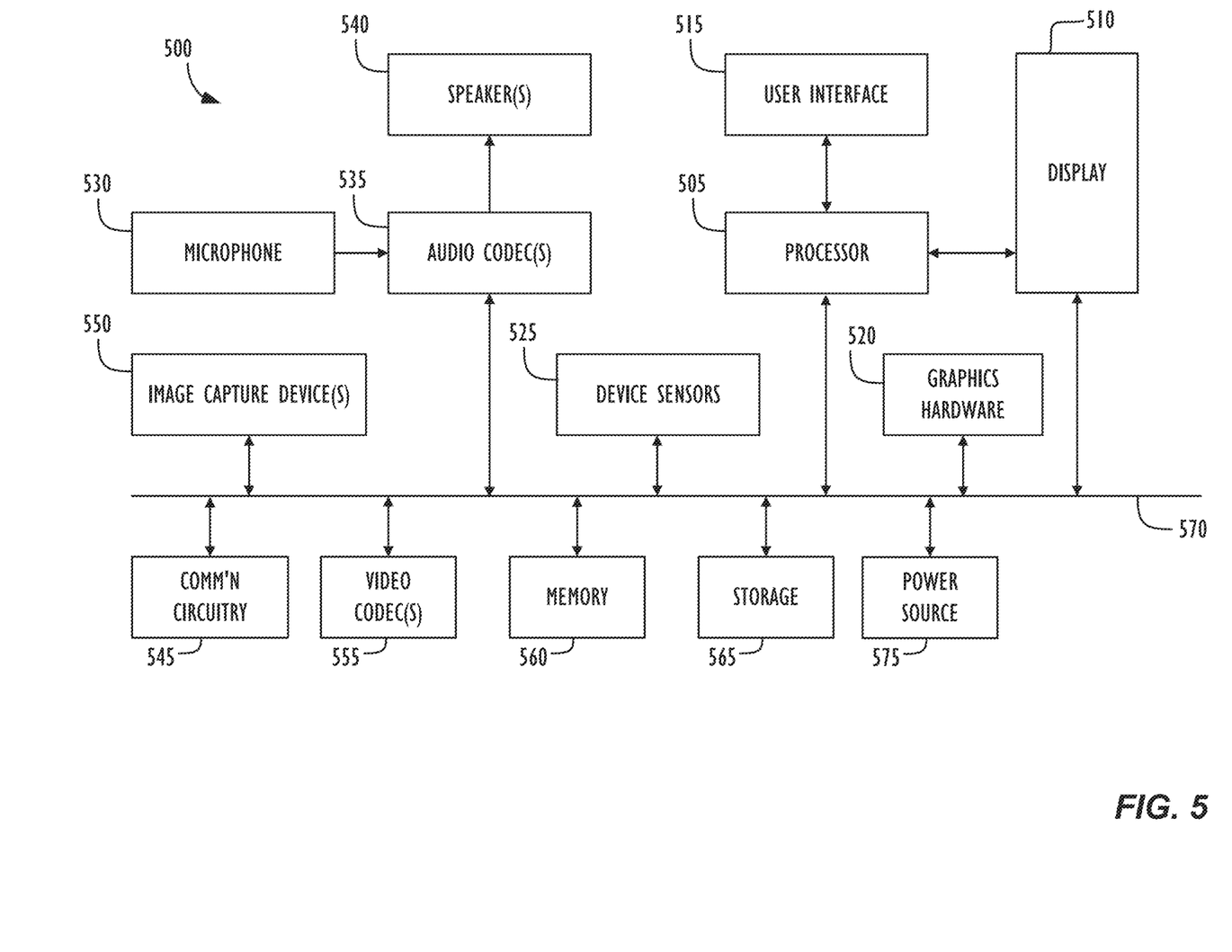
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., enrollment images which may be processed to generate customized 3D avatar model versions of said captured images, in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Memory 560 and storage 565 may comprise non-transitory program storage devices and be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   an image capture device; and one or more processors operatively coupled to the memory, wherein the one or more processors are configured to execute instructions causing the one or more processors to:
  obtain a first image captured by the image capture device, wherein the first image comprises a first subject wearing a first pair of eyeglasses;
  determine a first outline of the first pair of eyeglasses, wherein determining a first outline of the first pair of eyeglasses further comprises:
    extracting a set of edge pixels for the first pair of eyeglasses; and
    determining the first outline of the first pair of eyeglasses as an ordered list of key points, wherein the key points comprise representations of an outer edge of the first pair of eyeglasses;
  obtain an object library, wherein the object library comprises a first plurality of three-dimensional (3D) models of pairs of eyeglasses;
  determine a second outline for each of a first set of the first plurality of 3D models of pairs of eyeglasses in the object library; and
  determine a similarity score for each of the 3D models of pairs of eyeglasses in the first set based, at least in part, on a comparison of the first outline to the respective second outline for each of the 3D models of pairs of eyeglasses in the first set.

2. The device of claim 1, wherein the one or more processors are further configured to execute instructions causing the one or more processors to:
  determine a ranked listing of the 3D models of pairs of eyeglasses in the first set based, at least in part, on their respective similarity scores.

3. The device of claim 2, wherein the device further comprises a display and the one or more processors are further configured to execute instructions causing the one or more processors to:
  present, on the display, at least a part of the ranked listing of the 3D models of pairs of eyeglasses in the first set.

4. The device of claim 3, wherein the device further comprises a user interface and the one or more processors are further configured to execute instructions causing the one or more processors to:
  receive, via the user interface, a selection of a first one of the 3D models of pairs of eyeglasses in the first set; and
  present, on the display of the device, a view of an avatar representing the first subject, wherein the avatar is wearing the selected first one of the 3D models of pairs of eyeglasses.

5. The device of claim 1, wherein the first outline comprises an outline of a frontal view of the first pair of eyeglasses.

6. The device of claim 1, wherein the similarity score for each of the 3D models of pairs of eyeglasses in the first set comprises:
  an estimated area between the first outline and the second outline for the respective 3D model of pairs of eyeglasses in the first set.

7. The device of claim 6, wherein the instructions to determine a similarity score for each of the 3D models of pairs of eyeglasses in the first set further comprise instructions configured to cause the one or more processors to:
  align the first outline and the second outline for the respective 3D model of pairs of eyeglasses in the first set before estimating the area between the first outline and the second outline for the respective 3D model.

8. A non-transitory program storage device (NPSD) comprising computer readable instructions executable by one or more processors to:
  obtain a first image captured by an image capture device, wherein the first image comprises a first subject wearing a first pair of eyeglasses;
  determine a first outline of the first pair of eyeglasses, wherein the instructions to determine a first outline of the first pair of eyeglasses further comprise instructions to:
    extract a set of edge pixels for the first pair of eyeglasses; and
    determine the first outline of the first pair of eyeglasses as an ordered list of key points, wherein the key points comprise representations of an outer edge of the first pair of eyeglasses;
  obtain an object library, wherein the object library comprises a first plurality of three-dimensional (3D) models of pairs of eyeglasses;
  determine a second outline for each of a first set of the first plurality of 3D models of pairs of eyeglasses in the object library; and
  determine a similarity score for each of the 3D models of pairs of eyeglasses in the first set based, at least in part, on a comparison of the first outline to the respective second outline for each of the 3D models of pairs of eyeglasses in the first set.

9. The NPSD of claim 8, further comprising computer readable instructions executable by the one or more processors to:
  determine a ranked listing of the 3D models of pairs of eyeglasses in the first set based, at least in part, on their respective similarity scores.

10. The NPSD of claim 9, further comprising computer readable instructions executable by the one or more processors to:
  present, on a display, at least a part of the ranked listing of the 3D models of pairs of eyeglasses in the first set.

11. The NPSD of claim 10, further comprising computer readable instructions executable by the one or more processors to:
  receive a selection of a first one of the 3D models of pairs of eyeglasses in the first set; and
  present, on the display, a view of an avatar representing the first subject, wherein the avatar is wearing the selected first one of the 3D models of pairs of eyeglasses.

12. An image processing method, comprising:
  obtaining a first image captured by an image capture device, wherein the first image comprises a first object of interest;
  determining a first outline of the first object of interest, wherein determining a first outline of the first object of interest further comprises:
    extracting a set of edge pixels for the first object of interest; and
    determining the first outline of the first object of interest as an ordered list of key points, wherein the key points comprise representations of an outer edge of the first object of interest;
  obtaining an object library, wherein the object library comprises a first plurality of three-dimensional (3D) models of variants of the first object of interest;
  determining a second outline for each of a first set of the first plurality of 3D models of variants of the first object of interest; and determining a similarity score for each of the 3D models of variants of the first object of interest in the first set based, at least in part, on a comparison of the first outline to the respective second outline for each of the 3D models of variants of the first object of interest in the first set.

13. The method of claim 12, further comprising:
determining a ranked listing of the 3D models of variants of the first object of interest in the first set based, at least in part, on their respective similarity scores.

14. The method of claim 13, further comprising:
presenting, on a display, at least a part of the ranked listing of the 3D models of variants of the first object of interest in the first set.

15. The method of claim 12, wherein the first outline and each of the second outlines for the 3D models of variants of the first object of interest in the first set comprise: an outline of a specified view of the first object of interest; and outlines of the specified view of the variants of the first object of interest, respectively.

16. The method of claim 12, wherein the similarity score for each of the 3D models of variants of the first object of interest in the first set comprises:
an estimated area between the first outline and the second outline for the respective 3D model of the variants of the first object of interest in the first set.

17. The method of claim 16, wherein determining a similarity score for each of the 3D models of variants of the first object of interest in the first set further comprises:
aligning the first outline and the second outline for the respective 3D model of the variant of the first object of interest in the first set before estimating the area between the first outline and the second outline for the respective 3D model.

18. The method of claim 12, wherein determining a first outline of the first object of interest further comprises:
obtaining a first masked region from the first image, wherein the first masked region comprises an indication of pixels from the first image determined to be part of the first object of interest, and wherein the set of edge pixels are extracted from the first masked region.

19. The method of claim 18, wherein determining a first outline of the first object of interest further comprises:
placing the set of edge pixels over a grid comprising a plurality of cells; and
determining a center of mass of edge pixels located within each cell of the grid, and
wherein the key points further comprise the determined centers of mass of cells of the grid containing edge pixels representing an outer edge of the first object of interest.

20. The method of claim 12, wherein determining a second outline for each of a first set of the first plurality of 3D models of variants of the first object of interest in the object library further comprises:
for each 3D model of variants of the first object of interest in the first set:
extracting a set of edge pixels from the respective 3D model, as oriented in a specified view;
placing the set of edge pixels over a grid comprising a plurality of cells;
determining a center of mass of edge pixels located within each cell of the grid; and
determining the second outline of the respective 3D model as an ordered list of key points, wherein the key points comprise the centers of mass of cells of the grid containing edge pixels representing an outer edge of the respective 3D model of a variant of the first object of interest.

* * * * *